(12) United States Patent
Berkema et al.

(10) Patent No.: US 7,299,490 B2
(45) Date of Patent: Nov. 20, 2007

(54) PORTABLE WIRELESS DEVICE AND SOFTWARE FOR PRINTING BY REFERENCE

(75) Inventors: Alan C. Berkema, Granite Bay, CA (US); Jeff Morgan, Cupertino, CA (US); Pat Stoltz, San Diego, CA (US); Todd Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1160 days.

(21) Appl. No.: 09/897,656

(22) Filed: Jun. 29, 2001

(65) Prior Publication Data

US 2003/0005330 A1  Jan. 2, 2003

(51) Int. Cl.
*H04L 9/32* (2006.01)
*G06F 15/16* (2006.01)

(52) U.S. Cl. .................. 726/2; 709/218; 709/246
(58) Field of Classification Search ......... 709/217, 709/227, 230, 235, 245–6; 358/1.15
See application file for complete search history.

(56) References Cited

U.S. PATENT DOCUMENTS

| | | | |
|---|---|---|---|
| 5,539,665 A | 7/1996 | Lamming | |
| 5,848,413 A | 12/1998 | Wolff | |
| 5,862,321 A | 1/1999 | Lamming | |
| 5,915,214 A | 6/1999 | Reece | |
| 5,974,416 A | 10/1999 | Anand | |
| 6,173,407 B1 * | 1/2001 | Yoon et al. .......... | 713/201 |
| 6,184,996 B1 | 2/2001 | Gase | |
| 6,189,788 B1 | 2/2001 | Sherman et al. | |
| 6,219,151 B1 * | 4/2001 | Manglapus et al. ........ | 358/1.15 |
| 6,324,521 B1 | 11/2001 | Shiota | |
| 6,336,074 B1 * | 1/2002 | Woo .......................... | 701/208 |
| 6,347,340 B1 | 2/2002 | Coelho | |
| 6,379,058 B1 | 4/2002 | Petteruti | |
| 6,385,728 B1 * | 5/2002 | DeBry .......................... | 726/9 |
| 6,400,272 B1 | 6/2002 | Holtzman | |
| 6,407,820 B1 | 6/2002 | Hansen | |
| 6,448,906 B1 | 9/2002 | Nachtsheim | |
| 6,452,689 B1 | 9/2002 | Srinivasan | |
| 6,501,832 B1 * | 12/2002 | Saylor et al. ............ | 379/88.04 |

(Continued)

FOREIGN PATENT DOCUMENTS

EP  0886206  12/1998

(Continued)

OTHER PUBLICATIONS

Minasi (Mark Minasi, Mastering Windows NT Server 4, 6th edition, 1999, ISBN: 0782124453).*

(Continued)

*Primary Examiner*—Kambiz Zand
*Assistant Examiner*—Peter Poltorak

(57) ABSTRACT

A portable wireless device wirelessly communicates a reference to a print device causing the print device to use the reference to obtain a desired set of print content and further causing the print device to print the desired print content. The portable wireless device may also wirelessly communicate the reference to a print service which may respond to the reference by obtaining the desired print content, formatting the desired print content for printing, and communicating the desired print content to the print device for printing.

18 Claims, 10 Drawing Sheets

U.S. PATENT DOCUMENTS

| | | | |
|---|---|---|---|
| 6,583,886 B1* | 6/2003 | Ochiai | 358/1.15 |
| 6,601,102 B2 | 7/2003 | Eldridge | |
| 6,738,841 B1 | 5/2004 | Wolff | |
| 6,744,528 B2 | 6/2004 | Picoult | |
| 6,757,749 B2 | 6/2004 | Aoki | |
| 6,772,338 B1 | 8/2004 | Hull | |
| 6,778,289 B1* | 8/2004 | Iwata | 358/1.15 |
| 6,782,542 B1 | 8/2004 | Mein | |
| 6,842,460 B1 | 1/2005 | Olkkonen | |
| 6,857,023 B2 | 2/2005 | Rivadalla | |
| 7,086,001 B1* | 8/2006 | Hicks et al. | 715/523 |
| 2001/0016912 A1* | 8/2001 | Takahashi | 713/200 |
| 2001/0037462 A1 | 11/2001 | Bengtson | |
| 2001/0048533 A1 | 12/2001 | Koana | |
| 2002/0002592 A1 | 1/2002 | Aoki | |
| 2002/0076051 A1* | 6/2002 | Nii | 380/232 |
| 2002/0083114 A1 | 6/2002 | Mazzagatta | |
| 2002/0114004 A1* | 8/2002 | Ferlitsch | 358/1.15 |
| 2002/0174364 A1* | 11/2002 | Nordman et al. | 713/201 |
| 2002/0188646 A1* | 12/2002 | Terrill et al. | 709/101 |
| 2003/0020944 A1* | 1/2003 | Bhagal et al. | 358/1.15 |

FOREIGN PATENT DOCUMENTS

| | | | |
|---|---|---|---|
| EP | 0893760 | | 1/1999 |
| EP | 0936 808 | | 8/1999 |
| EP | 0 974 890 | | 1/2000 |
| GB | 2342197 | | 4/2000 |
| GB | 2356321 | | 5/2001 |
| WO | WO 01/33365 | | 5/2001 |
| WO | WO 01/42894 | * | 6/2001 |

OTHER PUBLICATIONS

Thambidurai, Deppa and Nakano, "Internet Printing", OKI Technical Review vol. 64, Aug. 1998.*

Wright, "Internet Printing Design Goals", RFC 2567, Apr. 1999.*

Z. Pie, L. Weidong, W. Jing, W. Youzhen, "Bluetooth-The Fastest Developing Wireless Technology", IEEE, vol. 2, Aug. 21, 2000, pp. 1657-1664.

* cited by examiner

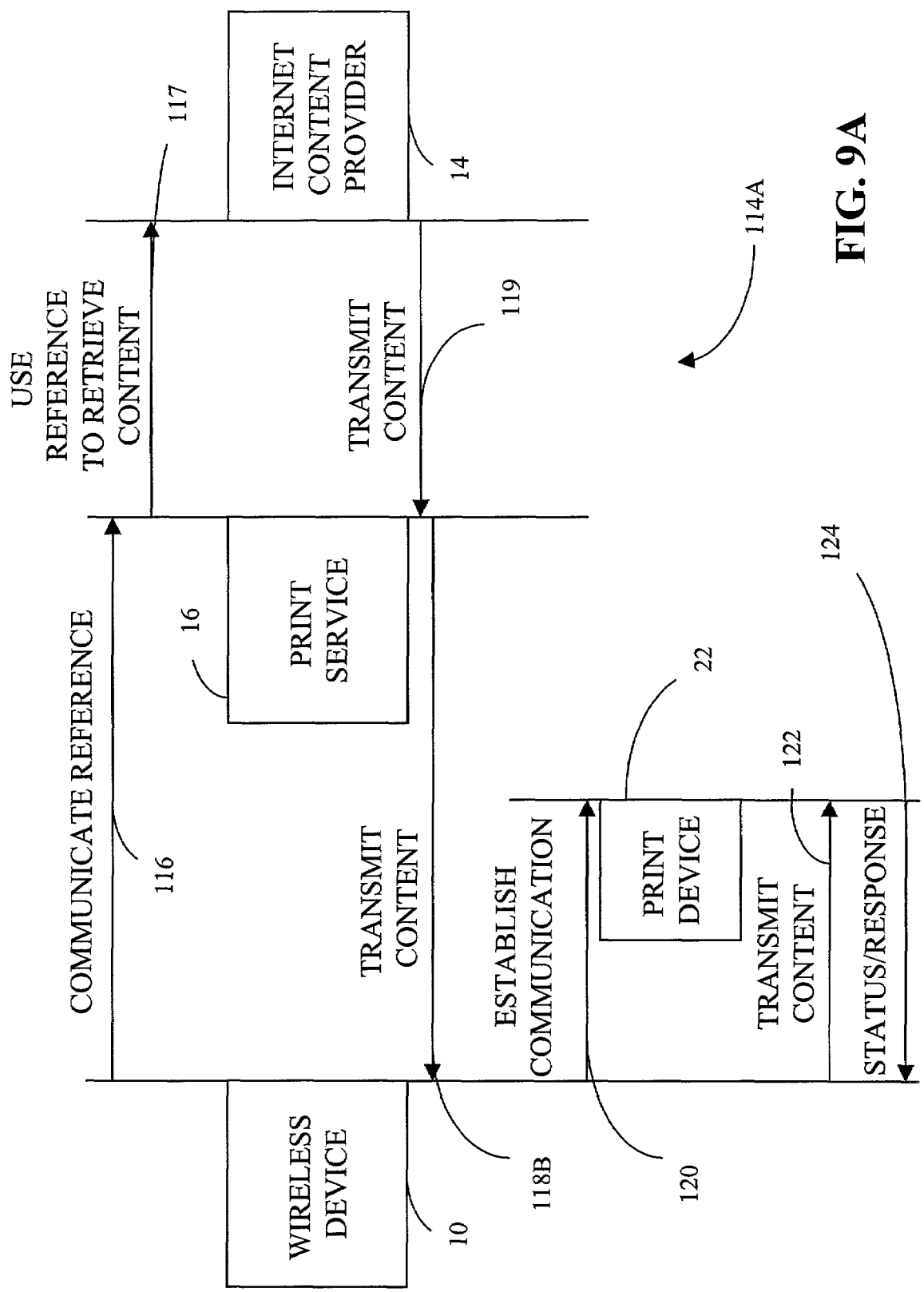

PORTABLE WIRELESS DEVICE AND SOFTWARE FOR PRINTING BY REFERENCE

FIELD OF THE INVENTION

A field of the invention is portable wireless devices. An additional field of the invention is printing.

BACKGROUND OF THE INVENTION

Portable wireless devices such as personal digital assistant (PDA) devices and portable wireless handsets, e.g., cell phones, enjoy widespread popularity. In particular, the portable, hand-held characteristics of these devices provide users with access to information and communication outlets in ways that were never before available. To ensure the continued popularity of portable wireless devices, attempts are being made to further expand the flexibility and capabilities of these portable wireless devices and to further enhance the services available to users of portable wireless devices. For example, portable wireless devices capable of accessing the Internet are available and Internet service providers that provide Internet access to portable wireless device users are becoming increasingly more common.

Unfortunately, the limited memory, display and bandwidth capabilities of portable wireless devices restrict the Internet content readily available to a portable wireless device user. Specifically, the Internet content available to the portable wireless device user is typically presented in a bare bones format so that portable wireless device capabilities are conserved. As a result, users will typically favor the richer Internet content available through traditional Internet connections such as workstations and computers unless circumstances such as travel prevent access to such computers. Thus, PDA devices and wireless handsets are typically used either to access highly basic content or to access content when circumstances prevent the user from accessing content from another device.

Printing offers the opportunity for a user to view rich content, and is often favored over viewing content through a full web browser or other application on a personal computer or work station. Unfortunately, the portable wireless devices, having limited capabilities, lack convenient printing mechanisms. Moreover, connecting a portable wireless device to a printer via a wired connection tends to defeat the purpose of having a portable wireless device.

One answer to these concerns is found in efforts to have the portable wireless devices communicate with peripherals and other devices through wireless communications. The Bluetooth RF communication format is. directed toward expanding the utility of portable wireless devices by providing a short range, typically about ten meters, communication channel for communications between portable wireless devices and other Bluetooth capable devices. However, standing alone, the communication channel offers little to solve the print content dilemma faced by users of portable wireless devices. Specifically, due to memory and bandwidth limitations portable wireless devices are relatively poor portals to push content from or through to a printer, even with the convenience of a Bluetooth or other similar wireless communication capability.

BRIEF DESCRIPTION OF THE DRAWINGS

FIG. 9A is a communication flow diagram illustrating a method for performing a print by reference request that involves providing a reference to a print service and receiving print content from the print service at a portable wireless device.

SUMMARY OF THE INVENTION

A portable wireless device wirelessly communicates with a print device to thereby provide a reference that indicates the location of a desired set of print content. In a typical preferred example, the portable wireless device might obtain a reference to desired print content, e.g., a Universal Resource Locator, while performing an operation such as web browsing over a wireless network. The portable wireless device includes the print content reference in a wireless communication signal to the print device which responds to the signal by accessing the network, retrieving the desired print content and then printing the desired print content. Alternatively, the print device may supply the reference to a print service which may retrieve the desired print content and format the desired print content for printing. The formatted content may then be transmitted directly or indirectly to the print device for printing.

DETAILED DESCRIPTION

A simple form of the invention is a portable wireless device having a set of wireless communication equipment that allows the portable wireless device to communicate with a set of wireless communication equipment disposed in a print device. The portable wireless device transmits a reference indicating a location of desired print content to the print device causing the print device to use the reference to obtain and print the desired print content. The print device may obtain the print content from the Internet content provider directly or may instead forward the reference to a print service which obtains the print content from the Internet content provider, converts the print content to a print ready format and then transmits the converted print content back to the print device for printing.

I. The Portable Wireless Device

Figure 1:
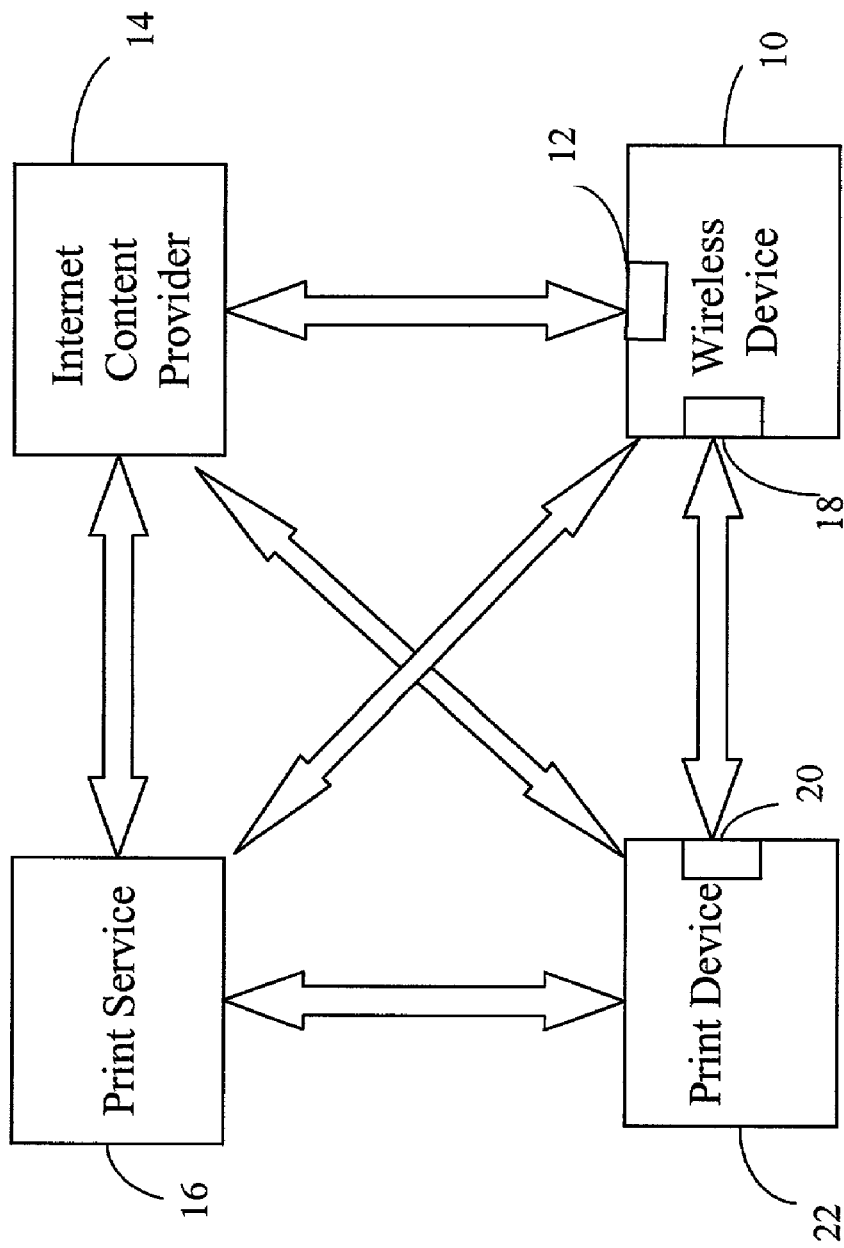
FIG. 1 is a block diagram of a communication network including a portable wireless device, a print device, an Internet content provider and a print service.
Figure 2:
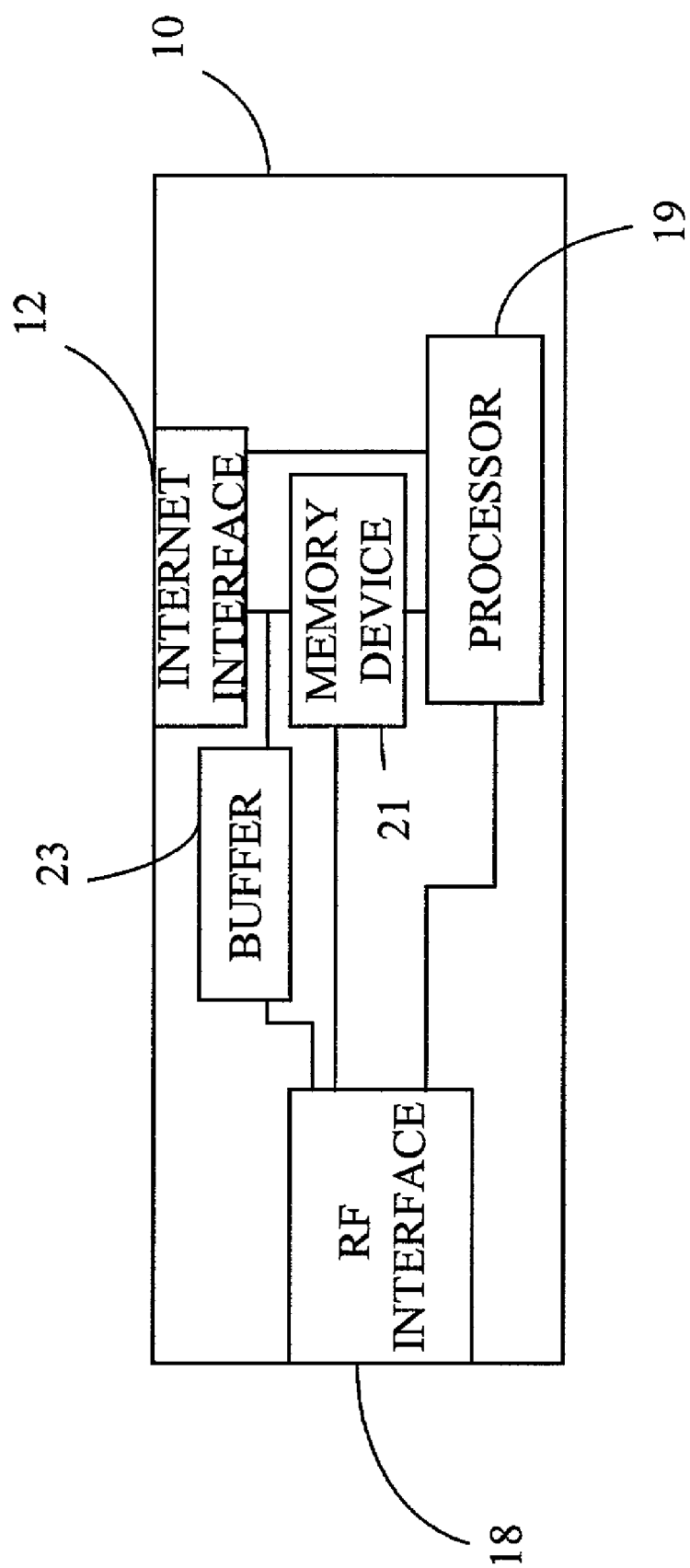
FIG. 2 is a block diagram of the portable wireless device of FIG. 1.

Referring now to FIGS. 1 and 2, a portable wireless device 10 having print by reference capabilities may comprise, for example, a personal digital assistant (PDA) or a mobile communication device that includes an Internet interface 12 for providing access to an Internet content provider 14 and/or for providing access to an Internet/network based print service 16. The Internet interface 12, although preferably able to support communication via cellular telephony, may instead communicate with the Internet content provider 14 via any desired method, e.g., via satellite communication. Further, although the portable wireless device 10 is described herein as enabling a print by reference feature for obtaining print content from the Internet, the portable wireless device 10 may be used to obtain print content from any type of network including, for example, a local area network, a wide area network, and an intranet. Thus, the Internet content provider 14 may represent any network content provider and the Internet interface 12 may interface with any type of network.

The portable wireless device 10 further includes an RF communication interface 18 that allows the portable wireless device 10 to communicate with an RF communication interface 20 disposed in a print device 22 such as, for example, a printer or a multi-function peripheral including a print function. Although, in a preferred embodiment the RF communication interface 18 communicates with the print device 22 using a Bluetooth wireless communication protocol and OBEX packet exchange format, the RF communication interface 18 may instead communicate with the print device 22 using any desired wireless protocol and packet format. For example, in a preferred embodiment, the portable wireless device 10 may be implemented with a Bluetooth enabled notebook computer having a Bluetooth PC card manufactured by 3Com that operates according to the Bluetooth 1.1 specification and the print device 22 may be implemented using a Hewlett Packard Deskjet 995c inkjet printer having integrated Bluetooth communication capabilities.

As illustrated in FIG. 2, the portable wireless device 10 further includes data processing and memory storage capabilities sufficient to enable a print by reference feature that allows the portable wireless device 10 to cause the print device to print print content. The data processing and memory storage capabilities may be implemented using, for example, a processor 19 and a memory device 21 for storing software instructions and further using a temporary memory buffer 23. A set of software instructions stored in the memory device 21 and executed by the processor 19 enable the print by reference features described herein. In addition, any number of hardware components may further be used to supplement or even replace the processor 19, the software instructions and the memory devices 21, 23 provided that the print by reference feature is supported thereby. As will be appreciated by one having ordinary skill in the art, the processor 19 may be implemented using any suitable processor or controller capable of executing software instructions or otherwise controlling the portable wireless device 10 to enable the print by reference features described herein. Further, the memory devices 21, 23 may be implemented using any memory devices capable of storing data. The portable wireless device 10 further may include a display (not shown) for displaying data and a control panel (not shown) by which a user may interface with the portable wireless device 10.

II. A Print by Reference Feature

A. Establishing Communication with a Print Device

A set of methods are now described as being illustrative of the variety of ways in which the print by reference feature may be implemented. Further, the methods, which are described with reference to a set of figures, i.e., FIGS. 3-9A/B, are described as being implemented using the wireless portable device 10 in cooperation with the print device 22, the print service 16 and the Internet content provider 14 shown in FIGS. 1 and 2. Thus, an understanding of the methods described with respect to FIGS. 3-9A/B may additionally require reference to the components illustrated in FIGS. 1 and 2.

Figure 3:
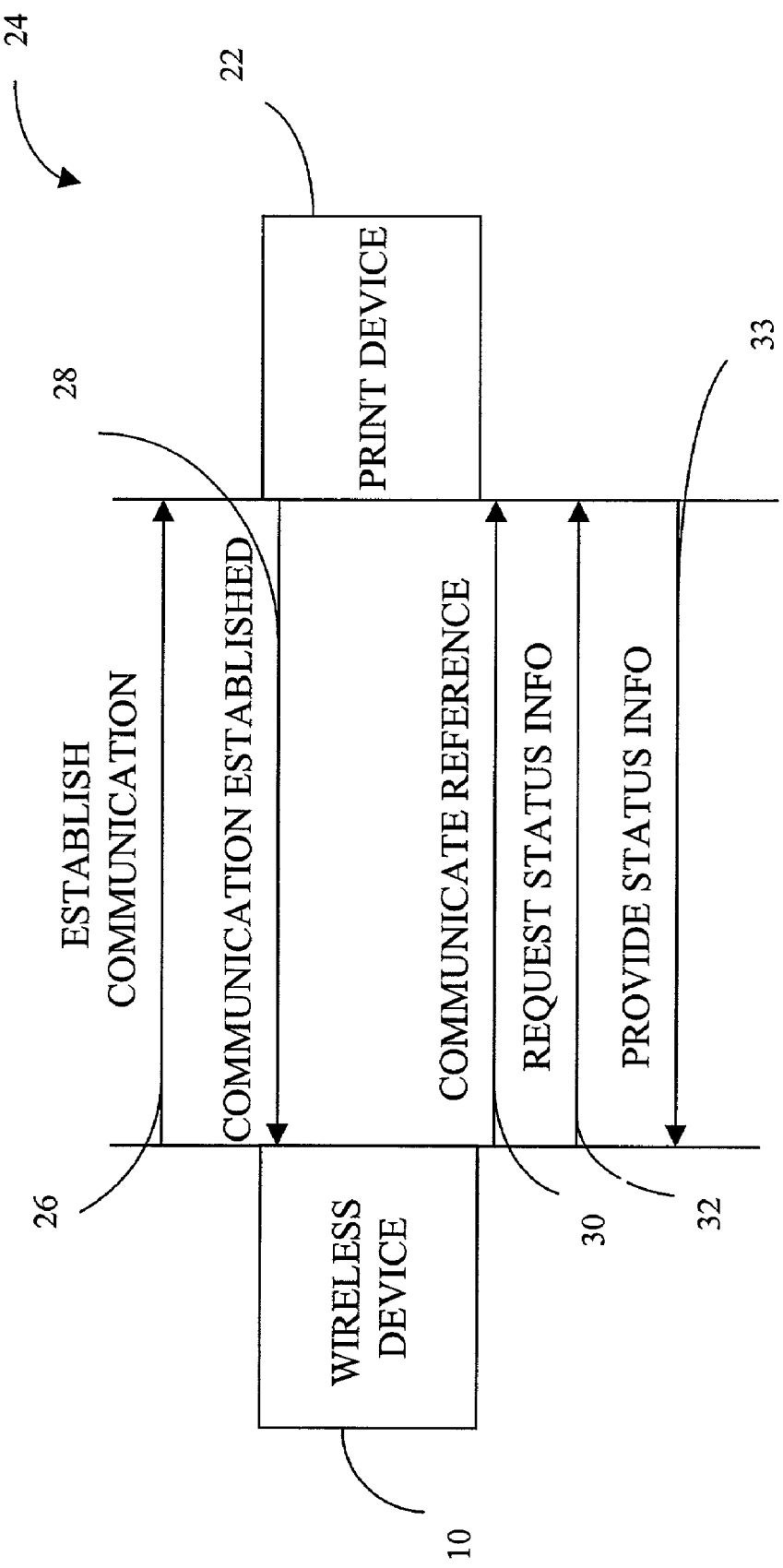
FIG. 3 is a communication flow diagram illustrating a method for performing a print by reference request.

Referring now to FIG. 3, the print by reference feature may cause the portable wireless device 10 to execute a first print by reference method 24 for causing a set of desired web pages or other desired print content to be printed. The first method 24 may begin when the portable wireless device 10 establishes communication with the print device 22 via the RF communication interface 18. As will be understood by one having ordinary skill in the art, the portable wireless device may perform any number of steps necessary to establish communication with the print device 22 in accordance with the communication protocol being used by the portable wireless device 10 and the print device 22.

B. Communicating a Reference to a Print Device

1. Communicating a Reference

After receiving the communication signal, the print device 22 may respond by, for example, informing the wireless device 10 that communication has been successfully established (step 28). In response, the portable wireless device 10 may wirelessly communicate a reference that identifies a location of the print content (step 30). Wirelessly communicating the reference to the print device 22 may further include any number of additional steps such as, for example, supplementing the reference with additional data to support different levels of print content retrieval and printing. For example, the reference may include only enough information to locate the desired print content, e.g., a content locator or URL. Alternatively, the reference may include a plurality of references, each reference representing separate print content and a separate print document.

2. Adding Information to a Reference

Still further, the reference may be supplemented to include a set of extensions or attribute fields that allow additional information to be supplied with the reference including, for example, a set of security access codes that may be used in response to security challenges to gain access to the print content, a URL that represents the location of a remote print service such as print service 16 to be used in accessing and formatting the print content for printing, and the time/date that the reference was sent to the print device 22. Other attribute fields may be defined to include, for example, a label providing a descriptive name for the location identified by the reference, a URL that represents a proxy service required to access the print content referred to by the reference, an internet address of the portable wireless device, an alternative reference or address for obtaining the same or substitute print content, and data indicating when print content should be printed beginning on a new sheet. Further, attribute fields may be defined to include information used to restrict access to the reference. For example, a type attribute may be defined to include an encoding type that indicates how the print content at the location identified by the reference is encoded. Further, a cookie attribute may be defined to associate a print by reference print job with previous information concerning reference content or a portable wireless device seeking to access referenced content.

As a further example, the reference may include a billing attribute that enables billing for services rendered. Specifically, any or all of the Internet content provider 14, the print service 16 and/or the print device 22 may require payment for usage thus requiring that each reference include information that identifies the user of the portable wireless device 10 that originated the print by reference request so that the user may be billed for the services used. For example, the user may be provided with an account number upon subscribing to the print service 16 or to the print device 22. Further, the account number may be stored in the memory 21 disposed in the portable wireless device 10 and the portable wireless device 10 may supply the account number in an extension of the reference each time that a print by reference request is executed. The print service 16 and print device 22 may verify that the account number is valid before rendering service, i.e., before processing a print by reference request for the user each time that a new print by reference request is transmitted. As will be appreciated by one having ordinary skill in the art, the reference extension may further be used to enable billing for services rendered using any of a variety of other methods.

3. Using a Reference to Obtain Print Content

After having received the reference, the print device 22 may respond by using the reference to download the print content associated with the reference from the Internet content provider 14, provided, of course, that the print device 22 is able to directly access the Internet content provider 14. Alternatively, the print device 22 may instead respond to the print request by providing the reference to a network/internet based print service 16 that retrieves the referenced print content from the Internet service provider 14, formats the referenced print content for printing and transmits the formatted pages to the print device 22 for printing.

C. Receiving/Displaying Status Information

After communicating the reference, the portable wireless device may communicate a request for status information to the print device 22 (step 32). The print device may respond by communicating status information such as, whether the print content was successfully retrieved from the Internet and/or whether the print content was successfully printed (step 33). Alternatively, the print device 22 may transmit the status message to the portable wireless device 10 after the print content has been successfully retrieved and before the print content has been printed and therefore only provide status as to the retrieval of the print content.

Upon receiving the status information, the portable wireless device 10 may perform any number of tasks including, for example, automatically displaying the message, causing the message to be stored in the memory device 21 disposed in the portable wireless device 10 and sounding an alarm that alerts the user as to the presence of the message, or simply causing the message to be stored in the memory device 21 disposed in the portable wireless device 10 so that the user may retrieve the message at a convenient time. Alternatively, instead of communicating a request for status information, the wireless device may instead wait for the print device 22 to transmit the status information automatically.

III. Obtaining a Reference

The reference specified in the print by reference request sent to the print device 22 (step 28) may have been obtained by the user from the Internet while using the Internet interface 12. Specifically, while using the Internet interface 12 to surf the Internet, the user may encounter the desired print content and, upon deciding to download the desired data, may cause the portable wireless device 10 to store a copy of a URL identifying the location of the desired print content into the memory device 21 disposed in the portable wireless device 10. This may occur, for example, when the user clicks on a hyperlink that causes the Internet content provider 14 to transmit a reference to the portable wireless device 10 through the Internet interface 12. In addition, selecting the hyperlink may further cause the wireless device 10 to invoke the print by reference feature thereby causing the method 24 of FIG. 3 to be performed using the reference obtained by selecting the hyperlink.

The reference supplied via the hyperlink may include additional data concerning the printing of the associated print content including, for example, the print policy of the Internet content provider 14. Specifically, the additional data included by way of the hyperlink may limit the number of copies of the requested print content that may be printed in response to the current print by reference request. Further, the additional data included by way of the hyperlink may include a reference identifying the location of a print service 16 that is suited for obtaining and formatting the desired print content, and may additionally include information associated with the cost of retrieving the print content and/or the method of billing the user for retrieval. For example, the reference may identify the location of the print service 16 by including a URL or other network address that may be used to locate the print service 16.

Alternatively, the URL may have been typed by the user directly into the portable wireless device 10 for storing in the memory 21, or the URL may have been stored in the memory device 21 by the user via a voice recognition/recording feature. Instead, the URL may have been received at the portable wireless device 10 via, for example, an e-mail message and then stored in the memory 21. Regardless of the method by which the URL was obtained or stored, the portable wireless device 10 may obtain the URL from the memory device before performing the step of communicating the URL to the print device 22 (step 28).

IV. Methods for Identifying a Print Device

A. Identifying a User Specified Print Device

Referring again to FIGS. 1 and 2, the print device 22 to which the portable wireless device 10 forwards the reference for processing may be determined using any number of methods. For example, the portable wireless device 10 may be preconfigured to transmit the packet of data having the print content reference to a specific print device 22 that is proximally located to the user during the user's daily routine, i.e., a print device residing in the user's office where the user spends most of the work day. As will appreciated by one having ordinary skill in the art, the portable wireless device 10 may be preconfigurable using any number of methods, including for example, a menu driven method wherein the portable wireless device 10 displays a print device selection menu that allows the user to select one or more print devices 22. Additionally, the portable wireless device 10 may supply a data input field in which the user may specify a default or preferred print device 22.

B. A Method for Discovering a Print Device

Figure 4:
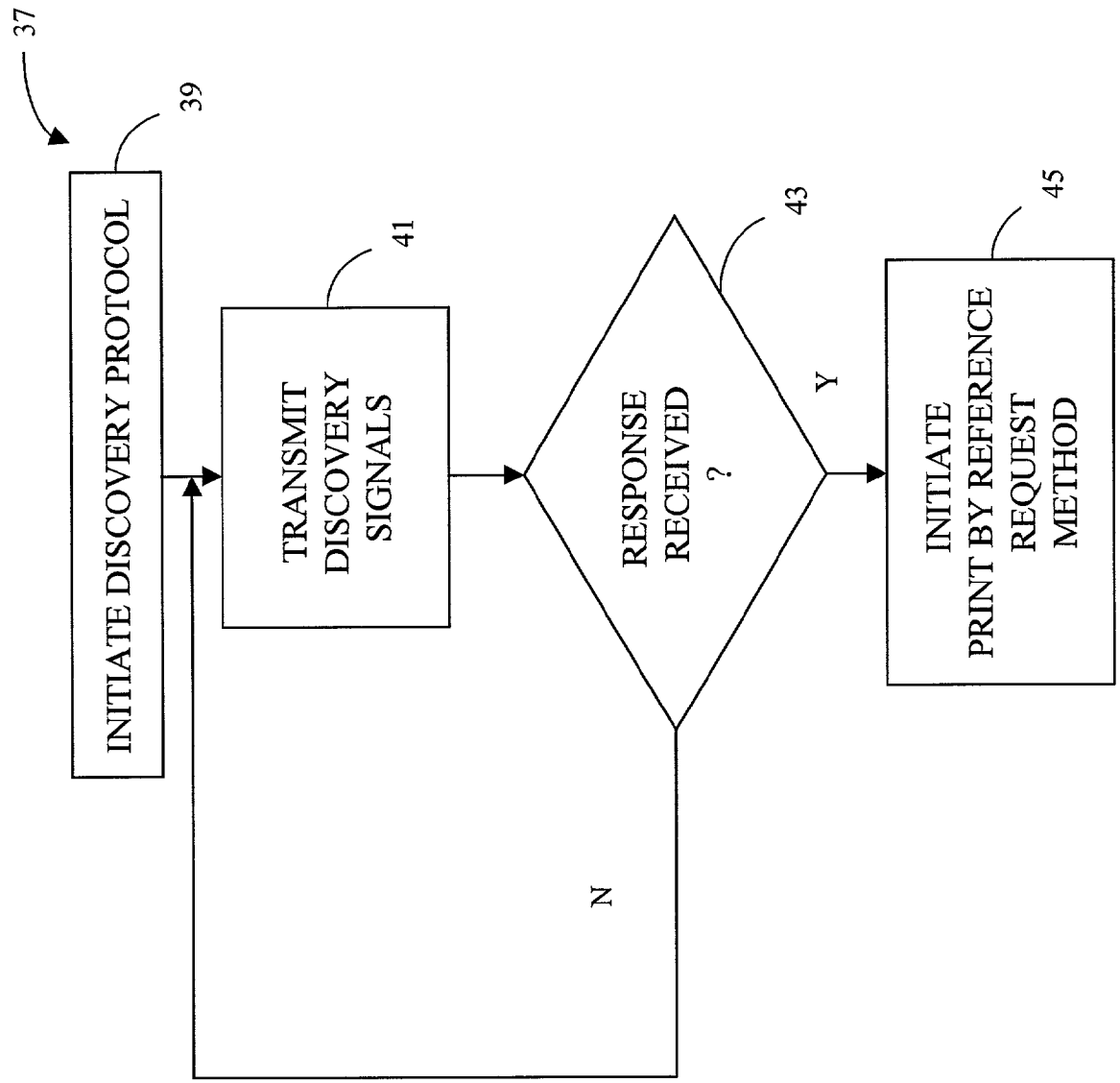
FIG. 4 is a flow chart representing a method for discovering the print device.

Referring now to FIG. 4, in another embodiment, the portable wireless device 10 may be configured to perform a method 37 for locating a print device 22 by transmitting a discovery signal according to a conventional local network discovery protocol. Specifically, a user may initiate the network discovery protocol using, for example, a print device discovery command (step 39) which may cause the portable wireless device 10 to transmit discovery signals that include an embedded request for information (step 41). The portable wireless device 10 may then wait until a response is received from one or more locally disposed print devices 22 (step 43).

As will be appreciated by one having ordinary skill in the art, conventional network discovery features allow a user operating a network device to discover other devices attached to the network. Further, the discovery feature is typically defined at least in part by the communication standard or specification associated with the network in use. Thus, the portable wireless device may transmit discovery signals according to the communication protocol for which the portable wireless device is configured. For example, if configured to operate using a Bluetooth communication protocol, the portable wireless device 10 may perform the discovery feature using a Service Discovery Protocol defined in the Bluetooth communication specification.

The responsive signals may include, for example, instructions regarding the location of the responding print devices 22 so that the user may proceed to the nearest print device 22 and cause the desired print content to be printed thereon by initiating a print by reference request (step 45). The responsive signals may further include information pertaining to the capabilities of the responsive print device 22. For example, the responsive signals may include information specifying whether the print device 22 has color printing capabilities, whether the print device 22 is equipped for printing specialized graphics files and further specifying the costs associated with using the print device 22 to print a document. The portable wireless device 10 may display the responsive information or otherwise communicate the information to the user so that the user may determine which of the responding print devices 22 to select. Of course, if no responsive signals are received at the portable wireless device 10, the portable wireless device 10 may again transmit print device discovery signals (step 41) for any number of times, until a responsive signal is received, or until the user halts the print device discovery method 37.

The print device discovery feature may be especially useful for the traveling user who frequents airports or other public places that may include, for example, kiosks equipped with print devices 22 for use by airport visitors. Thus, the responding print device 22 may provide the user with an airport terminal name and gate at which the kiosk is located.

As will further be appreciated by one having ordinary skill in the art, the portable wireless device 10 may initiate a network discovery protocol in response to any number of user inputs. For example, the portable wireless device 10 may display a menu having a plurality of options wherein one of the available options allows the user to initiate the network discovery protocol. Alternatively, the portable wireless device 10 may be equipped with a control switch or button that, when depressed by the user, causes the network discovery protocol to be invoked and when depressed a second time causes the network discovery protocol to be halted. Instead, the portable wireless device 10 may be configured to automatically invoke the network discovery protocol every time the portable wireless device 10 is powered up or every time a print by reference request is initiated.

V. Print by Reference Methods Requiring Security Access Codes

A. Transmitting a Security Access Code upon Establishing Communication

Figure 5:
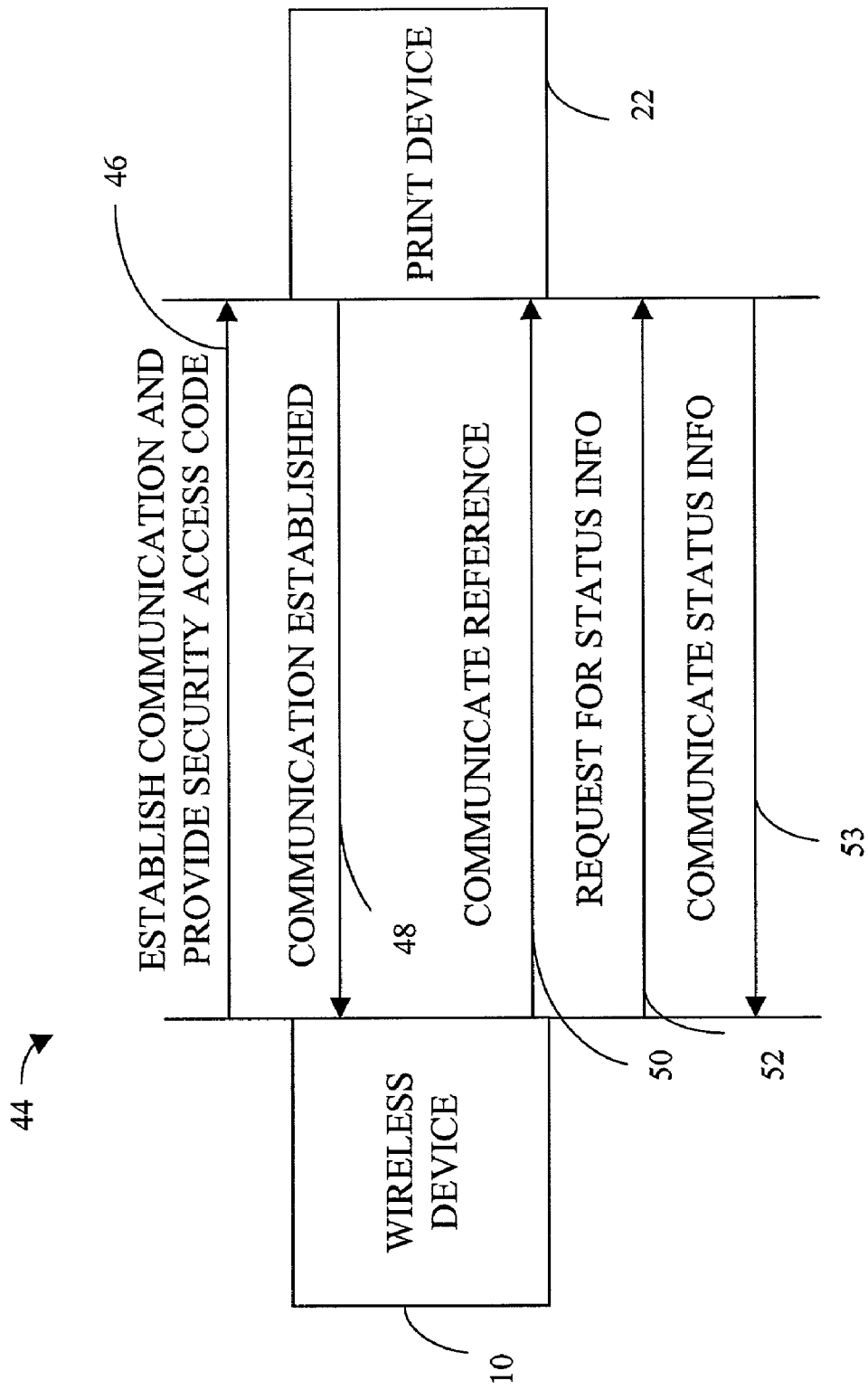
FIG. 5 is a communication flow diagram illustrating a method for performing a print by reference request that involves supplying a security access code to a print device.
Figure 6:
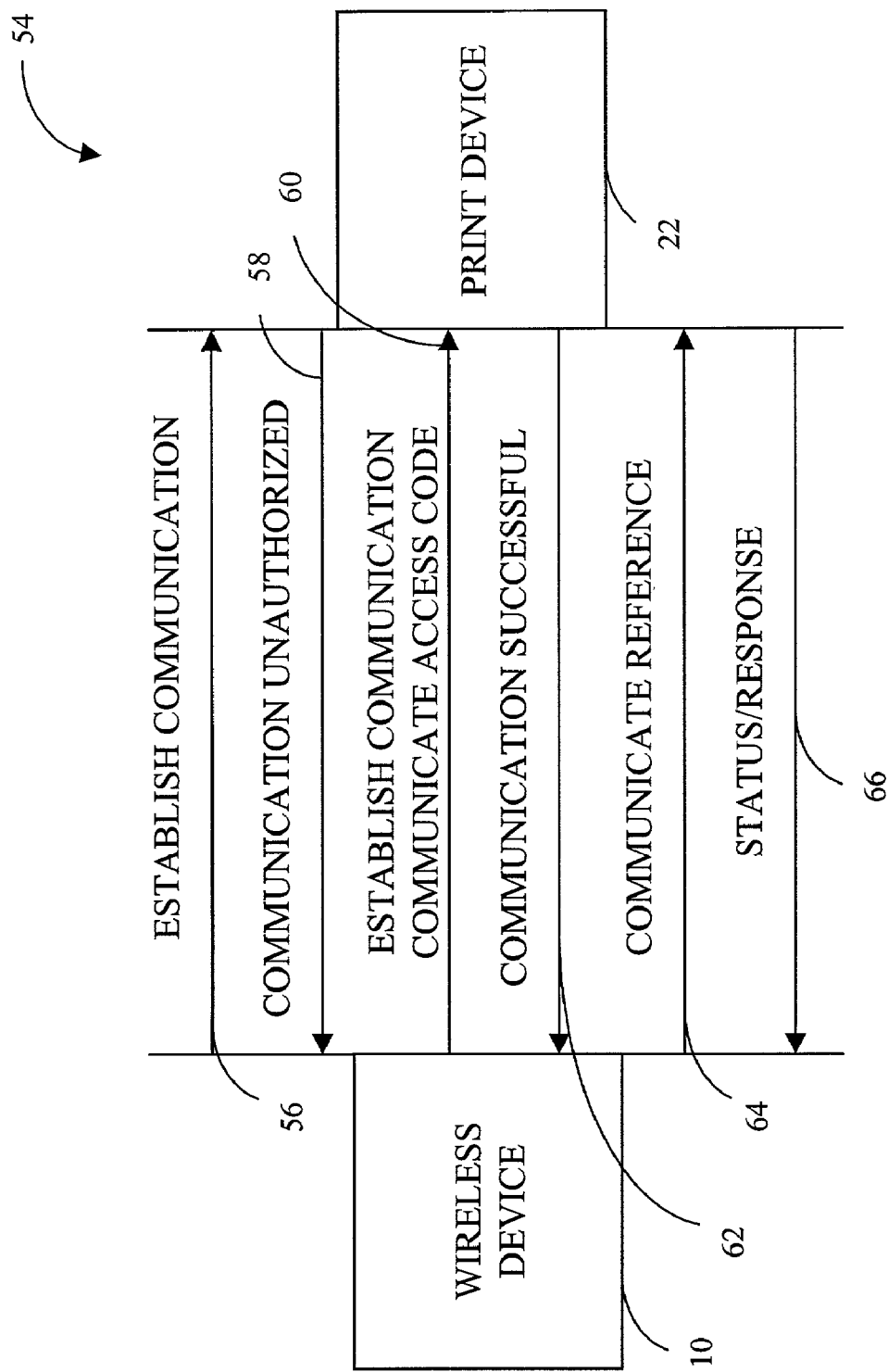
FIG. 6 is a communication flow diagram illustrating a method for performing a print by reference request that involves providing a security access code to a print device in response to a security challenge from the print device.

Referring now to FIG. 5, the first method for performing a print by reference request may be modified to allow for the transmission of security information by the portable wireless device 10 and thereby enable access to an otherwise restricted-access print device 22 and/or to enable access to secure print content. More particularly, when performing a print by reference request, the portable wireless device 10 may further transmit one or more security access codes that enable access to a print device 22 and/or the Internet content provider 14. Thus, a print by reference method 44 involving the transmission of security information required to access the print device 22 may begin when the portable wireless device 10 establishes communication with the print device 22 (step 46) and provides a security access code that allows access to the print device 22.

Upon receiving the access code from the portable wireless device 10, the print device 22 verifies that the proper access code has been supplied and, if the proper access code has been received, then responds to the portable wireless device 10 with a message that indicates that communication has been successfully established (step 48). After being informed that communication has been established, the portable wireless device 10 may respond by transmitting a reference that indicates the location of the desired print content (step 50). Thereafter the print device 22 either accesses the print content directly via the Internet content provider 14 or instead supplies the reference to the print service 16 so that the print service 16 may retrieve and format the print content as described above.

After communicating the reference the wireless device 10 may communicate a request for status information (step 52) to the print device 22 which may respond by sending the status information (step 53). The wireless device 10 may then receive and store the status information or display the status information for viewing by the user.

B. Transmitting a Security Access Code in Repsonse to a Security Access Challenge Referring now to FIG. 6, the portable wireless device 10 may instead be configured to withhold the security access code required to control the print device 22 until prompted according to yet another method 54 that begins when the portable wireless device 10 establishes communication with the print device 22 (step 56). The print device 22 processes the request to establish communication and responds with a security challenge indicating that the wireless device 10 is not authorized to use the print device 22 (step 58). In response, the portable wireless device 10 may again attempt to establish communication with the print device 22, this time providing the access code required by the print device 22 (step 60). The print device 22 verifies the access code and, if proper, supplies a message to the portable wireless device 10 indicating that communication has been successfully established (step 62). Of course, if the access code is improper, the print device 22 may again indicate that the portable wireless device 10 is not authorized to use the print device (step 58).

Once communication has been successfully established, the portable wireless device 10 communicates the reference associated with the desired print content to the print device 22 for processing (step 64). The print device 22 then uses the reference to download and print the desired print content from the Internet content provider 14. Alternatively, the print device 22 supplies the reference to the print service 16 for retrieval and formatting as described above.

Alternatively, the steps of re-attempting to establish communication with the print device 22 (step 60) and communicating the reference (step 64) may be performed in a single step. Specifically, in response to the security challenge, the wireless device 10 may communicate the reference having the security access code to the print device 22. The print device 22 may respond to the reference by verifying the security access code and then obtaining and printing the print content.

After the print by reference request has been processed, the print device 22 may supply a status message to the portable wireless device 10 indicating whether the print by reference request has been successfully processed (step 66).

Figure 7:
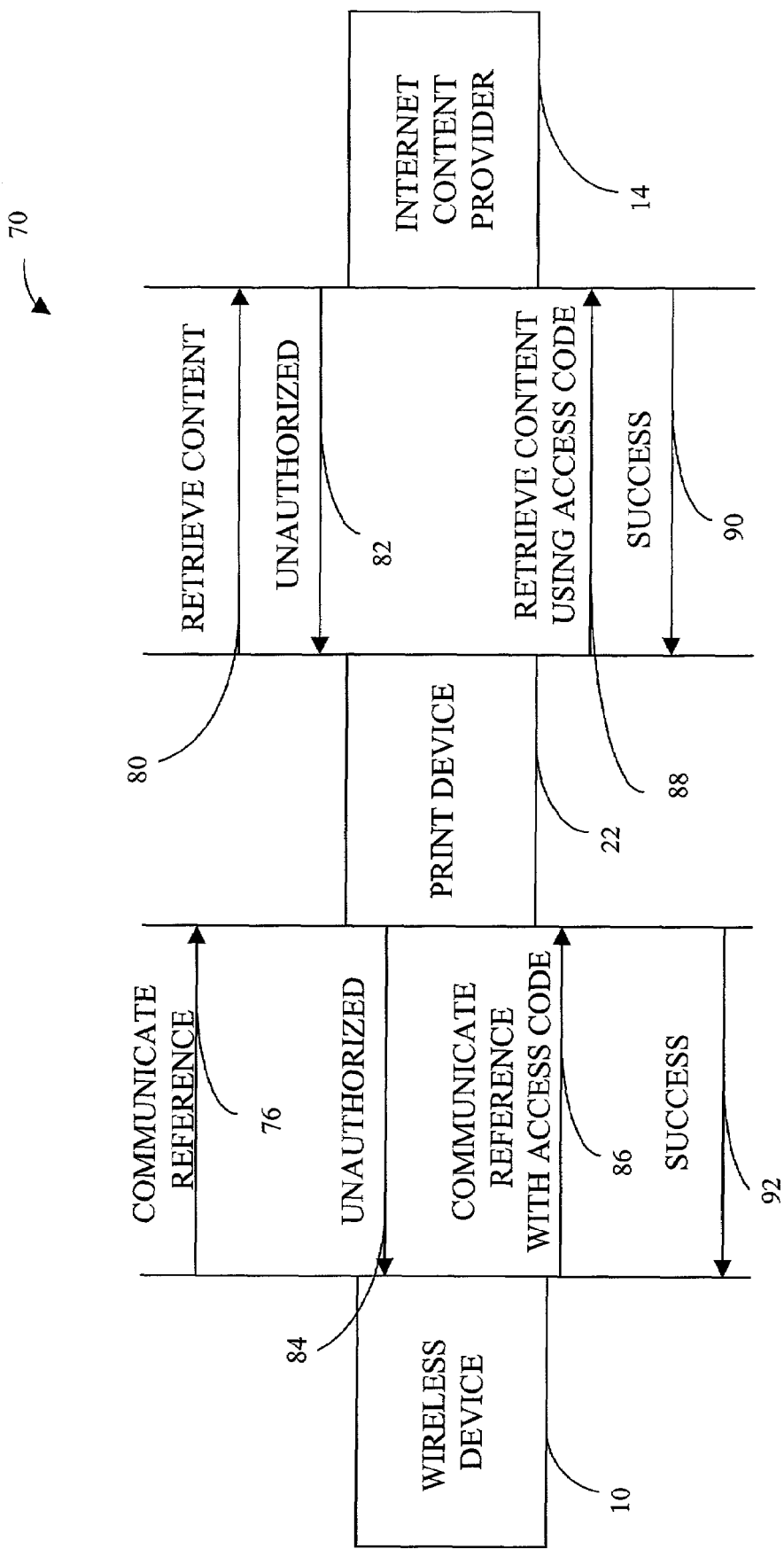
FIG. 7 is a communication flow diagram illustrating a method for performing a print by reference request that involves providing a security access code for use by the print device in accessing print content.

C. Transmitting a Security Access Code to Gain Access to Print Content via a Print Device Referring now to FIGS. 7 and 8, the portable wireless device 10 may further supply a security access code to gain access to the print content. Specifically, assuming that the portable wireless device 10 has successfully established communication with the print device 22, then, in accordance with a set of methods 70, 72 shown in FIGS. 7 and 8, respectively, the portable wireless device 10 may communicate the reference to the print device 22 (steps 74, 76). Next, the print device 22 forwards the reference to either the print service 16 (step 78; see FIG. 8) or the Internet content provider 14 (step 80; see FIG. 7) depending on whether the print device 22 is configured to access the Internet content provider 14 directly or whether the print device 22 is instead configured to access the print service 16. If supplied directly to the Internet content provider 14 as shown in FIG. 7, then the Internet content provider 14 may attempt to retrieve the desired print content residing at the location represented by the reference. If a security access code is required to access the desired print content, the website at which the desired print content is located may respond to the attempted retrieval of the desired print content with a security challenge thereby requesting that a security access code be supplied.

The Internet content provider 14 causes the request for a security access code to be transmitted back to the print device 22 (step 82) which, in turn, supplies the request to the portable wireless device 10 (step 84). The portable wireless device 10 may respond to the request by transmitting a reference including the required security access code to the print device 22 (step 86). The print device 22 then supplies the security access code to the Internet content provider 14 (step 88) which uses the access code to enable access to the print content. Provided that the security access code is acceptable, the Internet content provider 14 forwards the desired content to the print device 22 for formatting and printing therein (step 90). In addition to printing the desired print content, the print device 22 may transmit a message to the portable wireless device 10 indicating that the desired print content has been successfully retrieved and printed (step 92).

Figure 8:
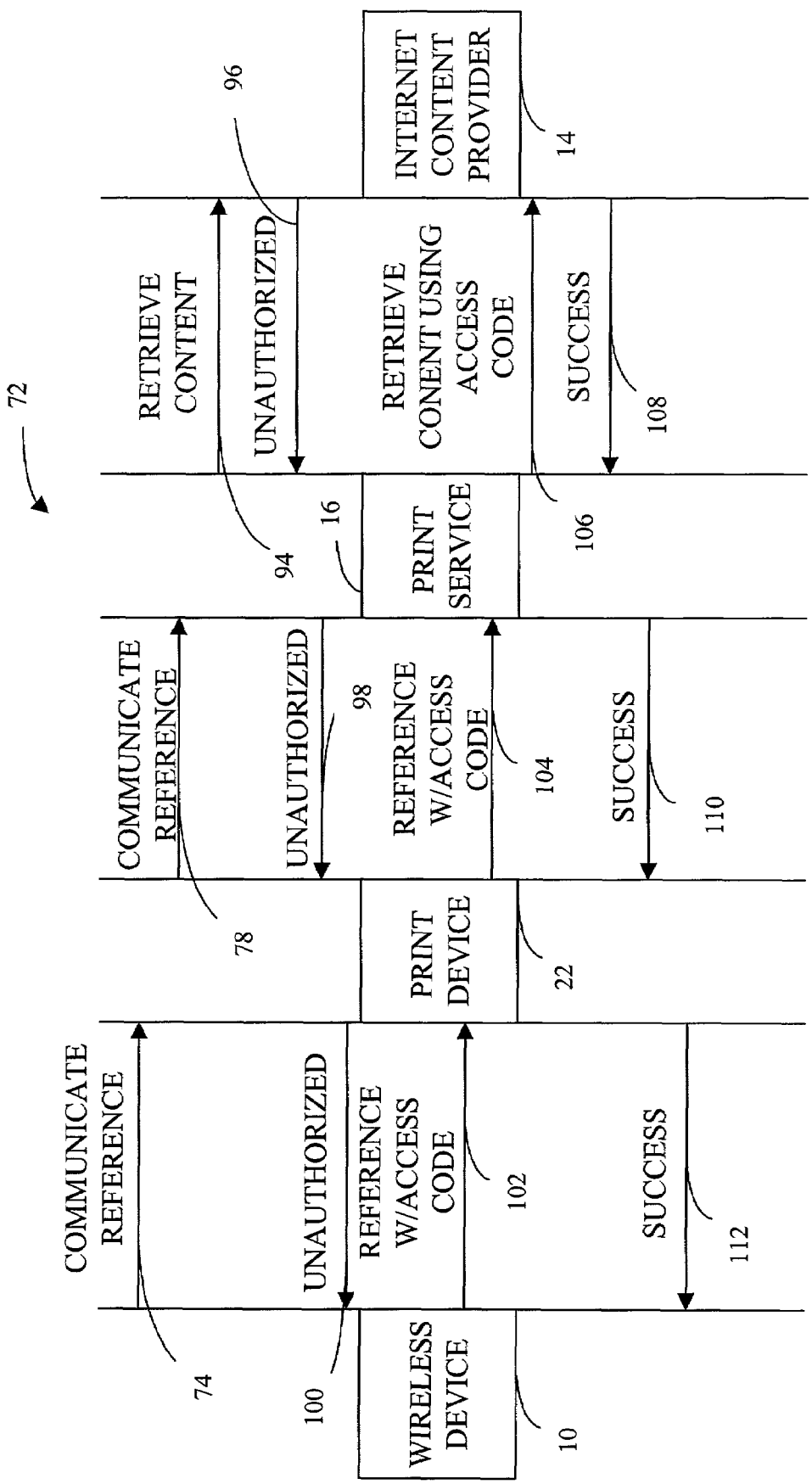
FIG. 8 is a communication flow diagram illustrating a method for performing a print by reference request that involves providing a security access code for use by a print service in accessing print content.

D. Transmitting a Security Access Code to Gain Access to Print Content via a Print Device and a Print Service If, instead, the reference is supplied by the portable wireless device 10 to the print service 16 as shown in FIG. 8 (step 78), then the print service 16 uses the reference to attempt to access the desired print content via the Internet content provider 14 (step 94). As described with respect to FIG. 7, the Internet content provider 14 may attempt to retrieve the desired print content residing at the location represented by the reference. If a security access code is required to access the desired print content, the website at which the desired print content is located may respond to the attempted retrieval of the desired print content with a security challenge thereby requesting that a security access code be supplied before access to the desired content is granted.

The Internet content provider 14 causes the request for a security access code to be transmitted back to the print service 16 (step 96) which, in turn, supplies the request to print device 22 for routing to the portable wireless device 10 (steps 98, 100). The portable wireless device 10 may respond to the request by transmitting a reference including the required security access code (step 102) to the print device 22. The print device 22 may then supply the security access code to the print service 16 (step 104) which may use the security access code to access the desired print content via the Internet content provider 14 (step 106). Provided that the access code is acceptable, the Internet content provider 14 allows the print service 16 access to the desired print content (step 108). The print service 16 thereafter formats the print content for printing and then forwards the formatted print content to the print device 22 for printing (step 110). In addition to printing the desired print content, the print device 22 may transmit a message to the portable wireless device 10 indicating that the desired print content has been successfully retrieved and printed (step 112).

Instead of withholding the security access code until prompted, the portable wireless device 10 may instead transmit the relevant security access code with the reference thereby eliminating the need for the Internet content provider 14 to request that the desired security access code be provided and thus eliminating the need to send the request from the Internet content provider 14 back to the portable wireless device 10 via the print service 16 and print device 22. Similarly, when a plurality of references, each having a different security access code, are transmitted to the print device 22 via a single print by reference request, the portable wireless device 10 may similarly be configured to either transmit the security access codes with the references or to withhold each security access code until a request for the access codes, either individually or jointly, is received from the print device 22.

VI. Methods for Obtaining Print Content via a Print Service

A. Downloading Print Content from a Print Service to a Print Device via a Portable Wireless Device Referring now to FIG. 9A, in yet another embodiment, instead of sending the print by reference request to the print device 22, the portable wireless device 10 may communicate directly with the print service 16. Specifically, according to yet another method 114A, the portable wireless device 10 may communicate the reference to the print service 16 (step 116) which may respond by retrieving the desired content via the Internet content provider 14 (steps 117, 119). The print service 16 may then format the print content for printing and transmit the formatted print content to a specified print device 22 (step 118A). The identity of the print device 22 may have been specified, for example, in the reference.

Provided that the print device 22 has the capability to convert the print content to a print ready format, the print service 16 may instead supply the print content to the print device 22 in a non-print ready format, in which case, the print device 22 will be required to perform any format conversions necessary to enable printing of the print content.

B. Downloading Print Content from a Print Service to a Print Device

Figure 9B:
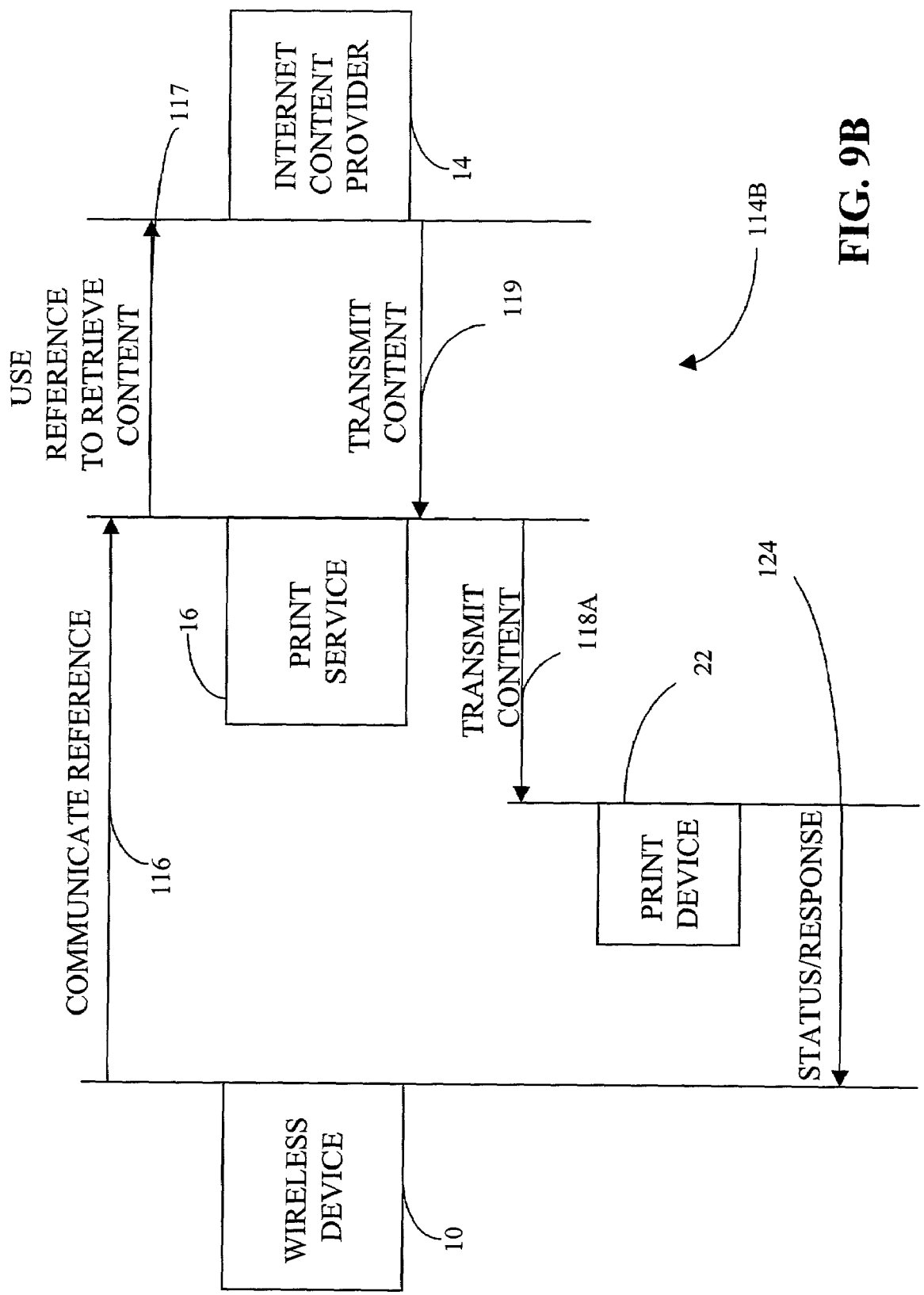
FIG. 9B is a communication flow diagram illustrating a method for performing a print by reference request that involves providing a reference to a print service and causing the print service to deliver print content to a print device for printing.

Referring also to FIG. 9B, according to still another method 114B, the print service 16 may transmit the print ready print content back to the portable wireless device 10 (step 118B) which may then cause the print ready print content to be forwarded for printing to a print device 22 of choice using a method similar to the method shown in FIG. 3. More particularly, the portable wireless device 10 may establish communication with the print device 22 (step 120) and, after communication has been established, may transmit the formatted print content to the print device 22 accompanied by a print request that causes the print device 22 to respond by printing the print content (step 122). Further, the print content received at the portable wireless device 10 is preferably communicated to the print device 22 using a store and forward operation, e.g., streaming, which may be performed using any of a variety of steps including temporarily storing the data received from the print service 16 in the memory buffer 23 disposed in the portable wireless device 10 and then converting the buffered data to a format suitable for transmission via the RF interface 18. After printing the print content, the print device 22 may transmit a status message indicating that the content has been printed (step 124).

The portable wireless device 10 may further receive one or more error messages from one or more of the print device 22, print service 16 or the Internet content provider 14. Moreover, the portable wireless device 10 may perform any of a variety of desired tasks in response to any of the received error messages. For example, upon receiving an error message indicating that communication was not successfully established, the portable wireless device 10 may make any number of further attempts to establish communication. In addition, upon receiving a security access code error, the portable wireless device 10 may resend the required security access code. Further, in response to an error message indicating that the reference does not exist or cannot be accessed, the portable wireless device 10 may display a message informing the user as to the inaccessible status of the reference. A message may also be displayed by the portable wireless device 10 when a status message is received from the print device 22 indicating the content of the status message.

From the foregoing description, it should be understood that a portable wireless device having a print by reference feature has been shown and described, having many desirable attributes and advantages. In particular, the portable wireless device provides a user with print capabilities. Specifically, the portable wireless device transmits a reference corresponding to a location at which desired network content is located to a print device. The print device, in turn, either accesses a network content provider to retrieve the desired network content or instead forwards the reference to a print service which accesses a network content provider to retrieve the desired network content. After retrieval, the print service formats the network content for printing and then delivers the formatted network content to the print device for printing. Likewise, if retrieved by the print device, the network print content is adapted for printing and then printed by the print device.

As will be appreciated by one having ordinary skill in the art, network security devices such as network firewalls typically prevent the reception of print content or any other information from the Internet at a user device unless initiated by the user. In some cases, the portable wireless device 10 may initiate a print by reference request and then act as a conduit to transfer the print content to the print device 22. In that case, the portable wireless device 10 may supply or push data to the print device 22 or the print service 16. In either case, data transferred from the Internet content provider 14 or the print service 16 to either of the portable wireless device 10 or the print device 22 is preferably performed using a data download or data pull operation wherein the data transfer is initiated by either the portable wireless device 10 or the print device 22. This avoids the firewall problem. Of course, if network security is not an issue, a data transfer may occur in any other manner. Likewise, data transferred from the portable wireless device 10 to the print device 22 may be pushed or uploaded from the portable wireless device 10 to the print service 16 and to the print device 22.

While various embodiments of the present invention have been shown and described, it should be understood that other modifications, substitutions and alternatives are apparent to one of ordinary skill in the art. For example, in addition to having data processing and memory storage capabilities sufficient to enable a print by reference feature, the portable wireless device may further include data processing and memory storage capabilities that enable a variety of other tasks. For example, the portable wireless device may include data processing and memory storage capabilities that allow the portable wireless device to function as a telephone, a personal computer, or to instead function as a personal assistant.

Further, although the print by reference feature is described as being implemented through the execution of a set of software instructions, the print by reference feature may instead be implemented using hardware or a combination of hardware and software.

Such modifications, substitutions and alternatives can be made without departing from the spirit and scope of the invention, which should be determined from the appended claims.

Various features of the invention are set forth in the appended claims.

What is claimed is:

1. A computer program product comprising a computer readable code stored on a computer readable medium that, when executed by a computer, causes the computer to:

transmit a discovery signal for locating one or more print devices, and wait for a response to the discovery signal from a print device before communicating the reference to the print device, wherein the response includes at least one of the location of the print device and a capability of the print device to print the print content, wirelessly communicate a reference to the print device, the reference identifying a location at which a print content of a content provider is located on a network and a location of a print service located on the network, wherein the print service is distinct from the content provider, and the location of the print service is distinct from a location of the print device, wherein the print service is adapted to retrieve the print content of the content provider from the network and format the retrieved print content for printing by the print device.

2. The computer program product of claim 1, wherein the computer readable code further causes the computer to:

wirelessly communicate a security access code to the print device.

3. The computer program product of claim 2, wherein the security access code enables usage of the print device.

4. The computer program product of claim 2, wherein the security access code enables access to the print content.

5. The computer program product of claim 2, wherein the computer readable code further causes the computer to wirelessly communicate the security access code in response to a security challenge received from the print device.

6. The computer program product of claim 1, wherein the computer readable code further causes the computer to;
before wirelessly communicating the reference to the print device, wirelessly communicate a discovery signal for locating one or more print devices; and
in response to the discovery signal, receive a responsive signal from one or more of the print devices including the print device, the responsive signal identifying the location of the print device.

7. The computer program product of claim 6, wherein the print device has one or more print capabilities, and wherein the responsive signal further identifies one or more of the print capabilities of the print device, the one or more of the print capabilities identifying a capability of the print device to print the print content.

8. The computer program product of claim 1, wherein the reference further comprises billing data.

9. The computer program product of claim 1, wherein the computer readable code further causes the computer to:
after wirelessly communicating the reference to the print device, communicate a request for status information to the print device; and
in response to the request, receive status information from the print device, the status information including at least one of status of retrieval of the print content and status of printing the print content.

10. A computer program product comprising a computer readable code stored on a computer readable medium that, when executed by a computer, causes the computer to:
transmit a discovery signal for locating one or more print devices, and wait for a response to the discovery signal from a print device before communicating the reference to the print device, wherein the response includes at least one of the location of the print device and a capability of the print device to print the print content,
wirelessly communicate the reference to the print device, the reference identifying a location at which a print content of a content provider is located on a network, wherein the reference causes the print device to retrieve the print content of the content provider from the, network and to print the print content,
wherein the computer readable code further causes the computer to add information to the reference before wirelessly communicating the reference to the print device,
wherein the information added to the reference comprises a locator, the locator identifying a location of a print service located on the network,
wherein the print service is distinct from the content provider, and the location of the print service is distinct from a location of the print device, and wherein the print service is adapted to format the print content for printing by the print device.

11. The computer program product of claim 10, wherein the information added to the reference comprises a security access code.

12. The computer program product of claim 10, wherein the information added to the reference comprises billing information.

13. The computer program product of claim 10, wherein the computer readable code further causes the computer to:
after wirelessly communicating the reference to the print device, communicate a request for status information to the print device; and,
in response to the request, receive status information from the print device, the status information including at least one of status of retrieval of the print content and status of printing the print content.

14. A portable wireless device comprising:
a communication interface adapted to enable wireless communication between the portable wireless device and a print device; and,
a processor coupled to the communication interface, the processor being adapted to cause the communication interface to wirelessly communicate a reference to the print device, wherein the reference identifies a location of a print content of a content provider on a network and a location of a print service on the network,
wherein the print service is distinct from the content provider, and the location of the print service is distinct from a location, of the print device,
wherein the print device is adapted to supply the reference to the print service, and
wherein the print service is adapted to retrieve the print content of the content provider from the network and format the print content for printing by the print device,
wherein the processor is further adapted to cause the communication interface to: transmit a discovery signal for locating one or more print devices, and
wait for a response to the discovery signal from the print device before communicating the reference to the print device, wherein the response includes at least one of the location of the print device and a capability of the print device to print the print content.

15. The portable wireless device of claim 14, wherein the processor is further adapted to cause the communication interface to communicate a security access code to the print device.

16. The portable wireless device of claim 15, wherein the security access code enables usage of the print device.

17. The portable wireless device of claim 15, wherein the security access code enables access to the print content.

18. The portable wireless device of claim 14, wherein the processor is further adapted to cause the communication interface to:
after wirelessly communicating the reference to the print device, communicate a request for status information to the print device; and
in response to the request, receive status information from the print device, the status information including at least one of status of retrieval of the print content and status of printing the print content.

* * * * *

UNITED STATES PATENT AND TRADEMARK OFFICE
CERTIFICATE OF CORRECTION

| | | |
|---|---|---|
| PATENT NO. | : 7,299,490 B2 | Page 1 of 1 |
| APPLICATION NO. | : 09/897656 | |
| DATED | : November 20, 2007 | |
| INVENTOR(S) | : Alan C. Berkema et al. | |

It is certified that error appears in the above-identified patent and that said Letters Patent is hereby corrected as shown below:

On page 2, in field (56), under "U.S. Patent Documents", in column 2, line 1, delete "Bhagal et al." and insert -- Bhogal et al. --, therefor.

In column 13, line 8, in Claim 6, after "to" delete ";" and insert -- : --, therefor.

In column 13, line 46, in Claim 10, after "from the" delete ",".

Signed and Sealed this

Second Day of September, 2008

JON W. DUDAS
*Director of the United States Patent and Trademark Office*